United States Patent [19]
Liebergeld

[11] 3,796,087
[45] Mar. 12, 1974

[54] APPARATUS FOR CONVEYING AN ELONGATED WORKPIECE

[76] Inventor: Rudolf Liebergeld, Gernotstrasse 51-55, Nurnberg, Germany

[22] Filed: Dec. 19, 1972

[21] Appl. No.: 316,560

Related U.S. Application Data

[62] Division of Ser. No. 63,784, Aug. 14, 1970, Pat. No. 3,719,069.

[30] Foreign Application Priority Data
Aug. 16, 1969 Germany.............................. 1941835

[52] U.S. Cl...................... 72/421, 10/12 T, 72/427
[51] Int. Cl............................................. B21d 43/02
[58] Field of Search ............ 72/427, 421, 344, 257; 10/12 T, 76 T

[56] References Cited
UNITED STATES PATENTS
3,452,582  7/1969  Faymonville.......................... 72/421

Primary Examiner—Charles W. Lanham
Assistant Examiner—Robert M. Rogers
Attorney, Agent, or Firm—Holman & Stern

[57] ABSTRACT

An apparatus for conveying an elongated workpiece into and out of a die of a press, said apparatus including an ejector slidable in the die, a workpiece gripper movable longitudinally and transversely with respect to the die and mounted in front of the die. The workpiece gripper is movable as a result of actuation by the ejector and a further workpiece gripper is provided. The further workpiece gripper is movable transversely of the die but is fixed against longitudinal movement relative to the die.

2 Claims, 2 Drawing Figures

PATENTED MAR 12 1974 3,796,087

3,796,087

APPARATUS FOR CONVEYING AN ELONGATED WORKPIECE

This is a division of application Ser. No. 63,784, filed Aug. 14, 1970, now U.S. Pat. No. 3,719,069.

BACKGROUND OF THE INVENTION

The invention relates to apparatus for conveying an elongated workpiece into and out of the die of a press to form the workpiece, the apparatus having a press ram, an ejector displaceable into the die and a conveying gripper, arranged in front of a front end of the die which is movable in a direction transverse to the direction of the length of the die and whereof the movement and actuation is controllable.

DESCRIPTION OF PRIOR ART

In one known apparatus for the cold or hot forming of workpieces, the workpieces, after ejection from a die, are gripped in one or more press stages simultaneously at the end opposite to the die by the conveying grippers and transported further in this condition. In the forming of long workpieces in closed dies, a large number of difficulties arise in gripping the workpieces securely in the conveying grippers and guiding them directly into a subsequent die. With long workpieces which have diameter differences, it is possible that they will be displaced into an oblique position, deviating from the direction of discharge, during the ejection process, so that a reliable gripping i.e., clamping by the conveying grippers, is no longer ensured.

FIELD OF THE INVENTION

An object of the invention is therefore to provide an apparatus of the type defined above in which even with long workpieces, reliable transfer to and from a die can be achieved with reliable gripping by the conveying gripper.

To this end the invention proposes an apparatus of the type defined above characterised in that the conveying gripper is movable in the direction of the length of the die, and at least a partial stroke of the conveying gripper engaging the workpiece takes place during the discharge motion of the workpiece, and in that the control of gripping by the conveying gripper is dependent upon the discharge movement of the ejector, and in that between the die and the conveyor gripper which is movable in the direction of the length of the die, an auxiliary gripper is provided which cannot move in a longitudinal direction but which is movable in a direction transverse to the length of the die.

In one embodiment in accordance with the invention, the elongated workpiece being transported is not only gripped at one end by the conveying gripper, it is also guided in the conveying gripper during discharge from the die or during introduction into the conveying gripper. By this means, an oblique disposition of the elongated workpiece in the conveying gripper is avoided and the entry of the long workpiece into the die is improved. The apparatus according to the invention is suitable both for conveying a workpiece from one die to another and also from a supply point at which workpieces are supplied for the purpose of being transported to a die, from which point they are transported to the die and then from the die to a discharge point at which the finished workpieces are removed from the conveying gripper. The danger exists with exceptionally long workpieces, if they can only be gripped by a gripper which is relatively narrow in relation to the length of the workpiece, that in spite of good gripper clamping they can no longer be guided accurately into the die opening of the following stage. Here the invention proposes that an auxiliary gripper be provided between the die and the conveying gripper which is movable in a longitudinal direction of the die, said auxiliary gripper not being movable in a longitudinal direction but able to move transversely to the direction of the length of the die.

The auxiliary gripper is fixed in the direction of ejection, i.e., is not displaceable in the longitudinal direction by withdrawal carriages and remains in front of the die opening. In its starting position, the conveying gripper lies immediately in front of the auxiliary gripper and operates as described above but preferably grips the workpiece to be conveyed in the region or the upper or front end thereof which first projects from the die during the discharge operation.

While the auxiliary gripper remains directly in front of the die opening, the conveying gripper grips the workpiece and pulls it over the withdrawal carriage, guided by the ejector or by other means that may be used in accordance with the invention, and completely out of the die opening. During the withdrawal operation, the auxiliary gripper engages the workpiece only loosely and clamps it only when the withdrawal operation is completed. In this position the long workpiece is tightly clamped at the ends adjacent the die by means of the auxiliary gripper and is centralised and clamped at its upper end by the conveying gripper. The transport of the workpiece to the next press stage takes place in this secured position.

In a preferred embodiment of the invention, it is proposed that a withdrawing motion of the conveying gripper encircling the workpiece is controlled in synchronization with the ejector. In this case the workpiece, as soon as it projects partly from the die, is engaged by the conveying gripper which then moves in synchronization with the ejector. The synchronization with the ejector prevents the occurrence of a forced longitudinal displacement of the workpiece within the conveying gripper which may result from a more rapid movement of the ejector with respect to the conveying gripper.

The synchronization between the movement of the ejector and the movement of the conveying gripper may be effected by a direct mechanical transmission of the ejector movement to the conveying gripper in the direction towards the press ram. In a multi-stage press with ejectors controlled and moved in unison, it is advantageous if the control of gripping by the conveying grippers proceeds independently and is adjusted individually for each conveying gripper independent of the withdrawal stroke, whereby the conveying grippers are part of a single delivery device that is movable as a whole.

It is often advisable where simultaneous withdrawing motion and clamping occurs, for each conveying gripper to have an individual withdrawal carriage and the withdrawal movement of each withdrawal to be controlled independently of the withdrawal movement of the other carriages. The commencement of the respective carriage movements and the strokes of the respective withdrawal carriages can then be decided for each conveying gripper individually.

A particularly advantageous further embodiment of the invention consists in that the discharge path of the ejector is shorter than the distance between the ejector and the front edge of the die and an additional lifting device acting on the conveying grippers is provided. The additional lifting device can operate by mechanical, hydraulic or pneumatic means.

The solution makes possible the use of shorter ejectors by which the end of the workpiece is not ejected up to the upper edge of the die. These are rendered significantly more stable and durable by the shortening of the ejectors. The shorter ejectors also serve to release the workpiece from the clamping die. During this releasing procedure, i.e., as long as the workpieces are being correctly guided by the shape of the die, the clamping of the workpiece by the conveying gripper may occur. On completion of the discharge stroke, the workpiece will however, remain partially within the die, but is released from the clamping effect of the die. If the discharge stroke itself has ended, then an additional withdrawal stroke begins which, by means of the additional drive mechanism, continues the gripper motion by hydraulic or pneumatic control until the workpieces are completely removed from the vicinity of the die.

Conveniently, the conveying grippers remain in an inoperative position during the release stroke of the ejector. After the workpiece is wholly or for the most part free of contact with the die, there occurs the withdrawal movement of the withdrawal carriage, separately controllable for each individual stage by means of mechanical, hydraulic or pneumatic actuation independent of the press ejector movement.

In order to introduce the workpiece into a die, the conveying gripper is moved in the direction of the ejector either by hydraulic, or pneumatic control or mechanically by means of rams or under the control of the ejector. In this case the entire feed motion, or only a second phase of the feed motion of the conveying gripper may be controlled, for instance, mechanically in synchronization with the press ram or with the retraction movement of the ejector. Preferably, it is proposed that during entry of the workpiece the conveying gripper is initially movable independently or the movement of the press ram and then in synchronization with the press ram or ejector and conveying gripper.

BRIEF DESCRIPTION OF THE DRAWING

An embodiment of the invention is shown diagrammatically in the drawing in which.

DETAILED DESCRIPTION

Figures 1, 2:
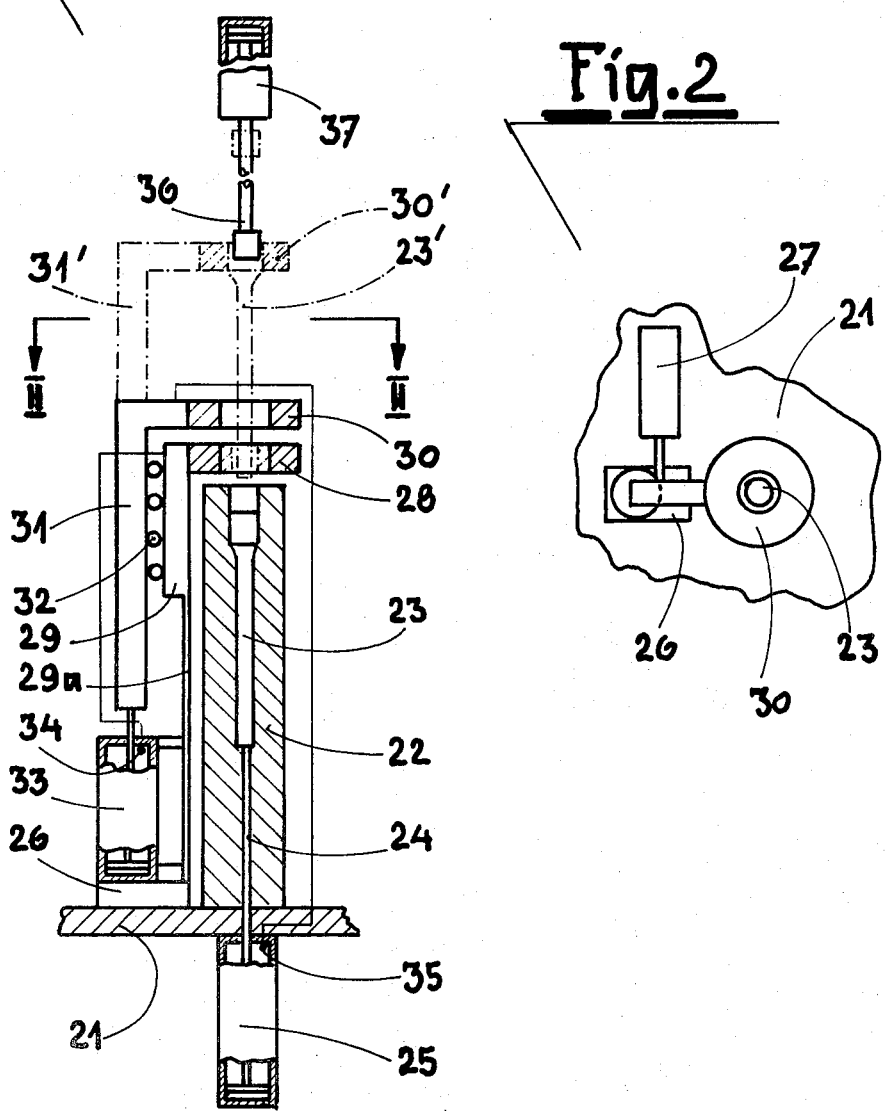
FIG. 1 is a side view of an apparatus for conveying an elongated workpiece.
FIG. 2 is a view along line II—II in FIG. 1.

In the apparatus shown in FIGS. 1 and 2, a die 22 stands on a base 21, said die 22 receiving a workpiece 23 and having projecting therein, from below, an ejector 24 which can be moved up and down by means of a hydraulic ejector unit 25 disposed below the base 21. Adjacent the side of the die 22, a carriage 26 which is mounted on the base 21 is movable transversely to the length of the die by means of a hydraulic mechanicm 27. An auxiliary gripper 28, whose operating mechanism 29, is located adjacent the side of the die 22, is arranged above the die 22, said auxiliary gripper 28 being supported by means of a strut 29a on the carriage 26.

Above the auxiliary gripper 28, there is a conveying gripper 30 which, together with its operating mechanism 31, is mounted on roller bearings 32 and is movable up and down by means of an additional drive mechanicm 33. Gripping of the auxiliary gripper 28 is actuated by means of a contact 34 which is closed when the drive mechanism 33 is extended, and the gripping of the conveying gripper 30 is effected by means of a contact 35 which is actuated when the hydraulic ejector mechanism 25 is extended. The conveying gripper which has moved upwards is referenced 30' and is shown in broken line.

Above and spaced from the conveying gripper 30, a retracted press ram 36 is provided which can be moved up and down by a hydraulic cylinder 37. The workpiece 23 is pushed into the die 22 and shaped by means of the press ram 36.

In use, first of all the ejector 24 is pushed forwards by means of the hydraulic ejector unit 25 and thus causes the workpiece 23 to become loose in the die 22 and an upper end of said workpiece 23 is pushed through the auxiliary gripper 28 and also through the conveying gripper 30. After the conveying gripper 30 has gripped the workpiece 23 when the hydraulic ejector unit 25 is extended, the workpiece is pulled completely out of the die 22 by extension of the additional drive mechanism 33. After the auxiliary gripper 28 has gripped the lower end of the workpiece 23 when the drive mechanism 33 is extended, the carriage 26 is displaced transversely by means of the hydraulic mechanism 27 and the workpiece 23 is thus moved from the die 22 and brought to the next handling stage or to the workpiece discharge stage. The dotted-line position 31' of the carriage 31 with the gripper 30' shows the workpiece 23 in a position 23' gripped at both ends.

I claim:

1. Apparatus for conveying an elongated workpiece into and out of an elongated bore in a die of a press having a press ram, said apparatus comprising an ejector mounted for sliding movement within the elongated bore, means for moving said ejector in the bore, a workpiece gripper mounted in front of the die, means for effecting transverse movement of said gripper relative to the die, means for moving said workpiece gripper longitudinally with respect to the die for at least a part of the stroke of said conveying gripper during its engagement with the workpiece during ejection movement of the workpiece, means for controlling gripping movement of said workpiece gripper in dependence upon ejecting motion of said ejector, and an auxiliary gripper which is fixed against movement longitudinally of the die but movable transversely of the die.

2. The apparatus according to claim 1, wherein the length of movement of said ejector is less than the distance between the front of the die and said ejector when retracted, and an additional lifting device is provided which acts on said conveying gripper to cause the latter to withdraw the workpiece from the die.

* * * * *